United States Patent [19]
Hoffman et al.

[11] 3,984,654
[45] Oct. 5, 1976

[54] ARC-WELDING POWER SOURCE

[75] Inventors: Wayne Edwin Hoffman, Chesterland; William Charles Downing, Novelty; Kenneth Anthony Golonka, Richmond Heights, all of Ohio

[73] Assignee: The Lincoln Electric Company, Cleveland, Ohio

[22] Filed: June 14, 1974

[21] Appl. No.: 479,312

[52] U.S. Cl. .............................................. 219/135
[51] Int. Cl.² .......................................... B23K 9/10
[58] Field of Search ..... 219/131 R, 131 WR, 131 F, 219/135; 322/27; 317/36 TD, 33 SC

[56] References Cited
UNITED STATES PATENTS

| | | | |
|---|---|---|---|
| 3,371,242 | 2/1968 | Aldenhoff et al. | 219/135 X |
| 3,590,323 | 6/1971 | Mapham et al. | 317/36 TD |
| 3,597,580 | 8/1971 | Stearns et al. | 219/135 |
| 3,746,965 | 7/1973 | Okada et al. | 219/131 WR X |
| 3,792,225 | 2/1974 | Needham et al. | 219/135 X |

FOREIGN PATENTS OR APPLICATIONS

| | | | |
|---|---|---|---|
| 375,539 | 10/1938 | Italy | 219/131 WR |

*Primary Examiner*—J. V. Truhe
*Assistant Examiner*—Clifford C. Shaw
*Attorney, Agent, or Firm*—Meyer, Tilberry & Body

[57] ABSTRACT

A multi-phase SCR-rectifier controlled arc welding power source having improved operating and internal protection characteristics. The transformer has an improved core and winding design having a built-in internal reactance and a core arrangement which is scrapless and very compact. The output has an adjustable, drooping, volt-ampere curve such that the welding current may be readily preset or adjusted to any desired value.

The power source includes an unusually high inductance for a three phase source so as to give a very stable arc with a control circuit having provisions to properly control the conduction angle of the SCR's so as to overcome the disadvantages of such a large choke on starting or short circuiting so as to give optimum welding characteristics. Further the ratio of short circuit current to welding current is controlled and decreases with an increase in the welding current. Protection against damage of the power source is provided in the event of extended short circuit or overload. Compensation for line voltage variation is also provided.

15 Claims, 5 Drawing Figures

ARC-WELDING POWER SOURCE

This invention pertains to the art of arc welding power sources and more particularly to a three phase, transformer-rectifier type variable voltage power source for DC manual and submerged arc welding.

Heretofore such power sources were unsatisfactory for manual or submerged arc welding because the control circuits for the SCR's did not have the proper response characteristics for use in conjunction with the inductive choke required in the power leads for good welding. Accordingly, a choke smaller than that necessary for a smooth stiff arc had to be employed. Furthermore the SCR's had to have a maximum current rating much larger than the maximum rated welding current to prevent damage thereto due to short circuiting of the output either on starting the arc or during welding.

The present invention provides a three phase transformer-rectifier-type, variable voltage power source for D.C. welding which overcomes the difficulties of the prior art and provides a forceful arc which produces less spatter and has less tendency for pop outs, particularly with low hydrogen electrodes.

In accordance with the invention, a transformer-rectifier-type arc welding power source is provided, comprised of a polyphase transformer having a series reactance such as to have a volt-ampere curve limited to the maximum output required of the power source, an SCR controlled rectifier bridge and an unusually large D.C. choke in the output for providing a highly inductive output and good arc stability in combination with a control for the SCR's which provides a voltage output curve having characteristics so as to offset the problems of such a large output choke on starting and short circuits. Further the control senses the transformer current and controls the SCR's to provide a constant arc current at any desired preset value.

The control circuit includes an iron cored choke in series with its input signal voltage which acts to delay the rate of change of the input signal to the control due to rapid changes in current through the SCR rectifiers, the core of which choke is moved toward saturation by increasing arc currents whereby the rate of change of the input signal to the control is more rapid at high welding currents than at low welding currents. This provides a faster control of the SCR's at the higher welding currents than at the lower welding currents.

Further in accordance with the invention, varying percentages of the input signal are fed to the control circuit depending upon the preset output current of the machine, with greater percentages being fed to the control circuit at the lower currents. With such an arrangement, the ratio of short circuit to welding current at low current outputs is greater than at the higher current outputs. These ratios may be as desired but at the minimum output conditions a 4 — 1 ratio is desired while at the maximum rated output conditions, a ratio of 1.25 — 1 is desired.

Further in accordance with the invention, the source, when a short circuit occurs, provides a short pulse of high current to the electrode to break the short and if such short is not broken in a predetermined time period, its SCR's are phased back at a controlled rate to prevent damage to the power components.

Further in accordance with the invention, a voltage proportional to the line voltage is fed to the control circuit to change the conduction angle of the SCR's and maintain the voltage output constant despite line voltage variations.

Further in accordance with the invention, the control circuit energizes the gates of the main SCR's with a high "back porch" voltage which insures the turning on of the SCR's at the prescribed angle.

Further in accordance with the invention a three legged three phase transformer is provided having a built in magnetic shunt dividing the legs into a close and a loose coupled portion with the primary being on the close coupled portion and secondary windings being divided into two sections one on each leg portion whereby to provide a transformer having a drooping volt-ampere curve. Further the division of turns of the secondary are such as to provide equal voltage outputs of each secondary winding.

The principal object of the invention is the provision of a new and improved arc welding power source of the transformer-rectifier type which enables improved and easier manual type welding.

Another object of the invention is a provision of a new and improved source of the type described wherein the three phase transformer is simple in construction and has a high built in internal reactance.

Another object of the invention is a provision of a new and improved source of the type described wherein the transformer core design is such that the laminations may be manufactured without producing scrap and the transformer may have a minimum physical size for a maximum power handling capability.

Another object of the invention is a provision of a new and improved control for a variable voltage transformer-rectifier type arc welding power source using SCR's having a control for changing the conduction angle of the SCR's which automatically changes the number of conduction periods for the SCR's to reach steady state condition to correspond with the preset welding currents.

Another object of the invention is a provision of a new and improved control which: permits relatively high short circuit currents for a brief period of time; and if the short circuit is not broken within such time period, phases back the SCR's to low-current within a controlled number of conduction periods.

Another object of the invention is a provision of a new and improved arc welding power source of the type described having a drooping volt-ampere output curve and means for varying the output voltage so that the arc current will remain constant at a preset value.

Another object of the invention is a provision of a new and improved arc welding power source of the type described wherein the arc voltage is varied to maintain the output current constant and provision is made for a brief high short circuit current to break a short circuit in the event the electrode should touch the workpieces, further in combination with means which will reduce the output of the source if the short circuit is not quickly broken.

Another object of the invention is a provision of a new and improved arc welding power source of the type described including means for varying the conduction angle of the SCR's to compensate for line voltage variation.

Another object of the invention is a provision of a new and improved arc welding power source of the type described having improved means for varying: in proportion to the arc welding current, the rate of change current circuit surges to the control upon the occurrence of short circuits in the event of short circuiting of the electrode to the workpiece.

Another object of the invention is a provision of a new and improved control circuit for SCR's in a transformer-rectifier arc welding power source wherein the ratio of short circuit current to welding current is substantially reduced at the higher welding currents.

The invention may take physical form in certain parts and arrangements of parts, a preferred embodiment of which will be described in detail in this specification and illustrated in the accompanying drawings which form a part hereof and wherein:

FIG. 5 is voltage-time curve showing the triggering voltages of the SCR firing circuit.

Figure 1:
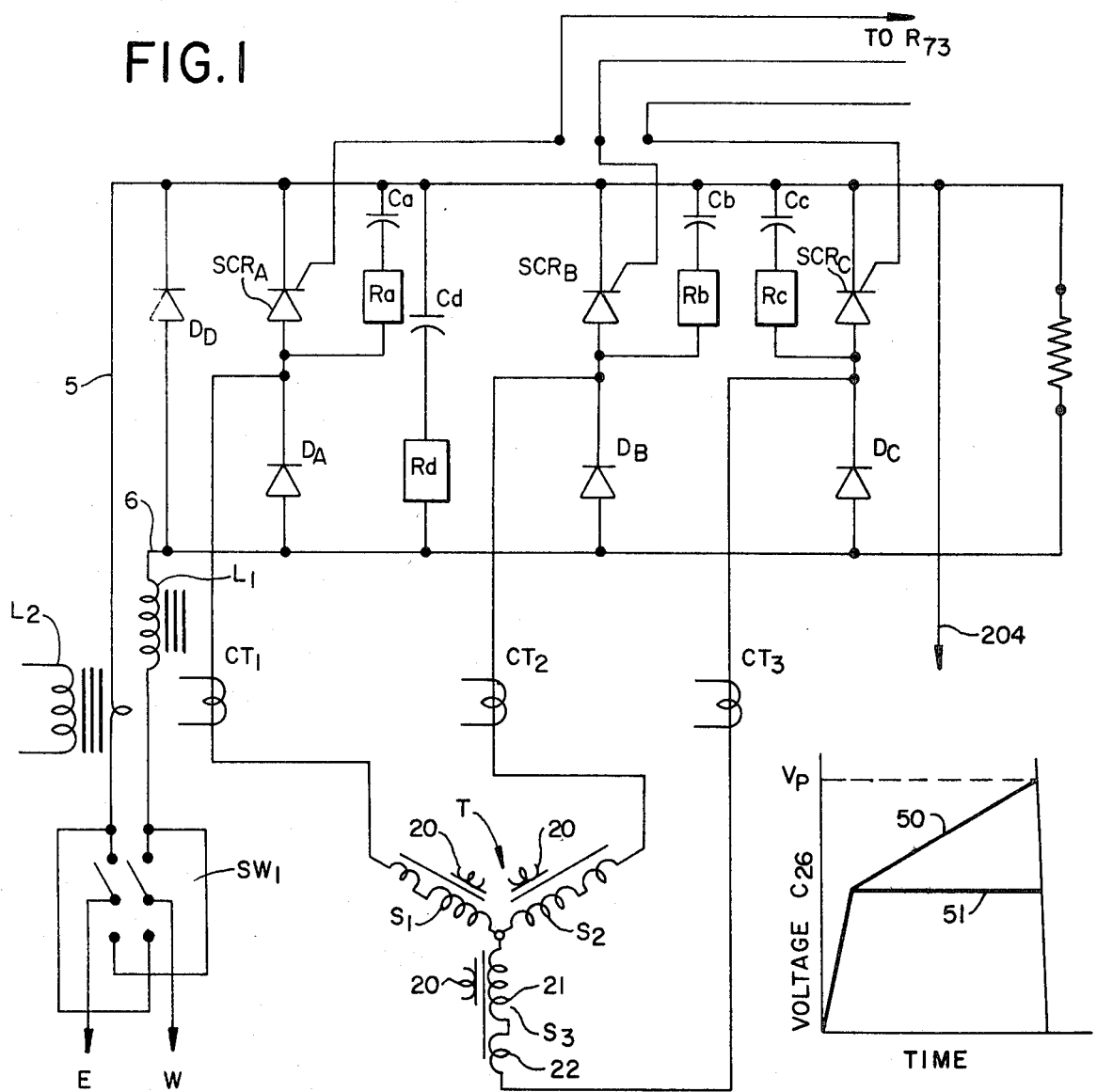
FIG. 1 is a schematic diagram of the main or power welding circuitry.
Figure 2:
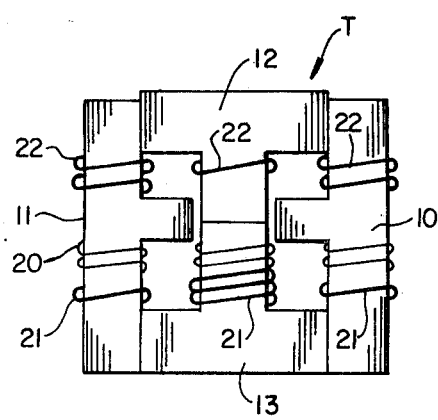
FIG. 2 is a schematic view of the transformer core and winding arrangement.

Referring now to the drawings wherein the showings are for the purposes of illustrating a preferred embodiment of the invention only and not for the purposes of limiting same, FIG. 1 shows a three phase transformer T having three primary windings 20 and three secondary windings S1, S2, S3 connected to a full wave semiconverter bridge, a choke L1 in series with the DC output leads of the bridge, and a polarity reversing switch SW1 in series with electrode and work terminals E, W. The output leads of the secondary windings each pass through a current transformer, CT1, CT2, CT3 the secondary windings of which are in a wye connection the purposes of which will be described hereinafter. The output lead of the bridge passes through the core of an inductance L2 for purposes of which will be described hereinafter.

The rectifier bridge is comprised of 3 diodes $D_A$, $D_B$, DC and 3 silicon controlled rectifiers $SCR_A$, $SCR_B$, $SCR_C$ in a conventional semi-converter bridge circuit. The latter will be referred to hereinafter generically as the main SCR's. Diode $D_D$ is connected across the output of the bridge. As is known, by controlling the phase angle of firing main SCR's relative to the alternating voltages applied to the rectifier bridge, the angle of conduction of the SCR's may be readily controlled and the output voltage of the power source readily controlled. The invention primarily relies in the design configuration of the transformer T and in the control circuit for controlling the firing of the SCR's.

TRANSFORMER DESIGN

The transformer T is of a new unique design wherein high internal leakage reactance is achieved through the use of an iron shunt path in the lamination assembly which separates a portion of the secondary windings from the primary windings. In the embodiment shown, the lamination assembly is made up of four T shaped iron sections; a right section 10, a left section 11, a center top section 12 and a center bottom section 13. The right and left sections are identical to each other and the center, top and bottom sections are identical to each other. The tops of the four T sections are all arranged in a rectangle with the legs of the T on the inside of the rectangle. The ends of the vertical legs of the top and bottom sections abut, with the sides of these legs positioned between and spaced from the ends of the horizontal legs of the right and left sections. These horizontal legs form a magnetic shunt path and the resulting core has three vertical legs with a portion of each leg below the shunt section and a portion of each leg above the shunt section. A primary winding 20 is placed below the shunt section on each of the three vertical legs formed by the four iron sections. The secondary windings S1, S2, S3, are each divided into a tight coupled portion 21 placed one on each of the three vertical legs below the shunt and thus adjacent to the primary windings and a loosely coupled portion 22 placed on the vertical legs above the shunt. The transformer thus has a built in leakage reactance resulting in a drooping volt-ampere output curve, the slope of which can be determined in advance by the design of the shunt air gap, lamination stack length and the ratio of turns in the loose and tight coupled portions.

With the configuration of the magnetic shunting path shown, the center loose coupled secondary winding will have approximately half the flux linkage with the primary windings as compared to the outside loose coupled secondary windings. The center secondary winding must therefore have a distribution of loosely and tightly coupled secondary turns different from that of the outside secondary windings. The distribution must be such that when the loosely and tightly coupled windings on each leg are connected in series, the resultant output is balanced reflecting the summation of the individual coils. In the preferred embodiment, the total secondary turns in each winding is the same with the center tight coupled secondary winding containing, 70 – 75% of the total secondary turns as compared to 40 – 42% of the secondary turns on the two outside tight coupled coils.

The transformer design provides internal magnetic shunts in a three phase scrapless lamination. This produces a high reactance transformer yet maintains a lamination stack length, leg height and coil configuration that results in efficient use of materials. Because of the internal reactance in the transformer, also the main SCR's can be operated near maximum conduction angle to achieve the maximum output of the power source. This enables the SCR's to operate at the lowest possible RMS current for a given conduction angle.

OUTPUT FILTER CHOKE

The D.C. output filter choke reduces the ripple voltage at low output current and the following criteria have been found desirable for different current rated power sources:

| Rated Maximum Current Amperes | Inductance m.h. | Flux Density lines/in 2 | | Amperes |
|---|---|---|---|---|
| 300 | 8.4 | 81,000 | at | 45 |
| 400 | 6.7 | 84,000 | | 50 |
| 500 | 5.5 | 90,000 | | 60 |

The choke iron section is a toroid wound with 14 ga. low carbon, hot rolled steel. This toroid iron section is then cut in two places, 180° apart, and a helical coil placed around the iron section. The iron section is then closed with air gap spacers inserted at the two cuts and the sections welded in place.

The inductance of the choke is unusually large for a three phase power source and provides excellent arc stability and reduces pop-outs.

CONTROL AND PROTECTION CIRCUITS

The control circuits control the SCR's to give a voltage output curve from the transformer-rectifier combination to overcome the difficulties on starting a short circuiting which such high inductance would cause.

Weld tests revealed that the SCR control circuit must be capable of providing the power source with a response time of 10 m.sec. This response is needed to achieve a step function response to a change in loading without having any overshoot. This means that as the electrode shorts momentarily during normal metal transfer, the transient short circuit current will not exceed that of a steady state short circuit of the same resistance path.

SNUBBER CIRCUIT

Snubber circuits are provided for the main rectifier bridge composed of resistor and capacitor networks that reduce rapid changes in voltage with respect to time, ($dv/dt$). There are four separate networks; $Ra$, $Ca$; $Rb$, $Cb$; $Rc$, $Cc$ which protect the main SCR's and $Cd$, $Rd$ which protects the three phase bridge. Diode $D_D$ protects the bridge from reverse polarity transients and aids in the commutation of the main power SCR's.

OUTPUT CURRENT CONTROL

The output current control receives a control signal from the secondaries of the current transformers, CT1, CT2, and CT3 which have a wye connection. Diodes D20 to D25 form a full wave three phase bridge which rectifies the voltage across these secondaries to provide a control signal. This signal from the current transformers is proportional to the load current of the transformer and performs two separate functions.

The first function of this rectified signal is to control the output of the welder by the amount of feedback fed into the main SCR firing circuits. This feedback will determine the conduction angle or phase back angle of the main SCR's. The time the SCR's are on during a forward biased condition is the conduction angle. The time the SCR's are off during a forward biased condition is the phase back angle.

As to the first function, there are two current dial selections A and B selected by ganged switches SW3, SW4, SW5 shown in the B position. Dial "A" expands the rotational adjustment for the lower third of the current range. Dial "B" is a fairly linear adjustment of the entire range of current of the machine Control of the output is performed by two groups of elements: one group for Dial A and a second group for Dial B with some elements common to both dials.

Output control elements that are common to both dials are R33, R37, C20, D26, D33, D34, D35, R1, R3, L2, D1, D2 and ganged switches SW3, SW4, SW5. Output elements exclusive to B dial are D27, D28, and R20. Output control elements exclusive to the A dial are D30, D31, R35, R34, R36, R4 and R5.

For Dial B the feedback voltage from the current transformers is developed across R1 and filtered by L2. This filtered feedback voltage is then fed into R3, the current control rheostat, which is in parallel with R33. The portion of the voltage taken from the slider of R3 is taken through D26 and developed across wires 205 to 204 and clamped by D27 and D28 so an excess of feedback voltage does not enter the firing circuit. R20 is an adjustable resistor (trimmer) that sets the calibration of the B scale. Its function is to distribute load points evenly over the rotation of the current control rheostat adjustment. D26 is covered in the fault protection explanation. C20 is an R.F. bypass filter.

For Dial A diodes $D_1$ and $D_2$ are in and open circuit and the feedback voltage from the current transformers is developed across R1 and R4 and filtered by L2. This filtered voltage is then fed into R3, the current control rheostat, which is in parallel with R33. The feedback is taken between points 205 and 204 and clamped by R35, D30 and D31. The addition of R4 and R35 provides more feedback voltage for a given low value of current than Dial B. The remainder of the circuit consists of R34 and R36. R36 is an adjustable resistor (trimmer) which in conjunction with R34 sets the calibration of the expanded low current Dial A. Diodes D1, D2 prevent interaction of the A and B dials. Resistor R5 limits the maximum current adjustment of the expanded low current dial A. C20 is an R.F. bypass filter common to dials A and B. SW3, 4, 5 is the selector switch for Dial A or Dial B. The switch switches the components that are exclusive to Dial A or Dial B into and out of the circuit.

Diodes D33, D34 and D35 maintain feedback to the firing circuit if the current dial selector is switched under load.

The output of the current control is fed to the base of Q40 one in each of three SCR firing circuits by wire 205.

In operation the feedback voltage or signal is proportional to the load current and is generated by the current transformers in each of the three legs of the three phase transformer secondaries S. It is then rectified by D20–D25 and filtered by choke L2 which is a unique choke system. The choke L2 is iron cored and has a nominal inductance of 1 henries and a resistance of 17 ohms. The D.C. welding current lead 5 is coupled to the iron core by passing through it to aid in the saturation of the choke thus reducing its inductance at the higher welding currents. The choke L2 also has a resistor R37 bypassing it for allowing rapid changes in welding current to feed a portion of the signal into the control circuit without any time delay. At low currents it takes twice as long as at high currents for the main SCR's to reach a new steady state value. This system of choke employing variable inductance and resistor R37 bypass, allows enough filtering to eliminate any overshoot on feedback, good dampening factor, and at the same time, introduces proper system response, i.e. changes in output of the main SCR's to cause the proper system dynamics for good constant current welding. This choke system filters the small conduction angle signals that are generated at the low currents. As the welding load current increases, the inductance and thus the effect of choke L2 becomes less and less. This is important as it insures good tracking of the three main SCR's. Tracking is the ability of all three SCR's to conduct at the same conduction angle.

The response of the system is extremely important in starting of the electrode and the stability of the arc under the dynamics of arc welding. At minimum welding current it takes three SCR conduction periods to get to a steady state value from open circuit to short circuit. Each succeeding pulse is phased further back until steady state is achieved.

When the short is broken, at minimum output current setting, it takes six to seven SCR conduction periods to reach open circuit. Each pulse increases the conduction angle until the open circuit condition is established. This is due to the choke L2 in the signal conditioning section of the circuit. To get from open circuit to a load condition other than a short, the response is one to two conduction periods of the SCR's.

At higher current settings of the current control rheostat R3, a smaller percentage of the feedback signal is used for controlling the output. At these higher current levels, since the choke L2 is in saturation it takes two SCR conduction periods to get to steady state on short circuit and it takes only three conduction periods of the SCR's to return to open circuit from a short circuit.

FAULT PROTECTION

The second function of the signal from the current transformers is to sense the magnitude of the output current and reduce the conduction angle after a specific period of time of overload. This reduction in conduction angle will reduce the output of the power source until the overload is removed from the transformer. This protects the components of the power source from overstress due to excessively long overloads.

As to the second function, the overload protection circiut will decrease the conduction angle of the main SCR's under overload conditions at a controlled rate. Once an overload condition is established, the divider network, R30, R31, R29 and filter capacitor C26 will switch transistor Q21 into the on state. Zener diode DZ21 sets the switching voltage and trimmer R31 sets the percentage of feedback voltage to trigger the transistor Q21. Once Q21 switches, C24 charges through R27 in a fixed R-C time constant. Once C24 charges to the switching voltage of the silicon unilateral switch (SUS), the SUS will trigger and fire SCR-1. Once SCR-1 fires, C25 will discharge through R23 and will supply the holding current for SCR-1.

R25 and C21 is a snubber circuit for SCR-1 to prevent false triggering and C23 and R26 protect the gate of the SCR-1 from false triggering in the presence of R.F. interference. Once SCR-1 is fired, a voltage is developed across R22, R32, R24 and R28. The voltage across R22 and R32 charges C22 which provides a time constant that will gradually turn on Q20. DZ20 clamps the voltage across R22, R32 and R24 so the time constant is repeatable. Zener diode DZ22 protects the circuit from voltage transients. Once Q20 turns on, a current flows through R20 and R21 that is a function of the total feedback voltage. This is contrasted to the partial voltage supplied by the divider network of R3. Diode D26 is used to prevent current from flowing through the adjusted resistance of R3. Once the total feedback from the current transformer CT is fed into the firing circuit by wire 205, minimum output is obtained. Since the only power supply for the circuit comes from current feedback, to reset the circuit, current must stop flowing, i.e. the load must be broken. This will reset the overload protection circuit as SCR-1 will turn off.

The fault protection circuit has several unique features. When the overload or fault circuit is activated after a predetermined time delay of the R27, C24 time constant, the controlled feedback is gradually raised by the time constant of C22, R24, R28 to the 100% value which yields maximum phase back of the SCR's and a preset minimum output. This is necessary to avoid a shoot through condition that will cause one of the main SCR's to carry maximum current. A fault condition is an accidental short of the machine for one second. An overload condition is a load exceeding the rating of the machine for two to three seconds. In both cases, there is a gradual, 500 milliseconds typical, decrease in phase back after the initial time duration of the overload or fault.

The signal conditioning of the control circuit and feedback elements is extremely critical. Too much filtering causes unstable operation due to poor response time. Too little filtering causes too rapid of a charge in feedback which will yield unstable operation dynamically.

FIRING CIRCUIT

Figure 3:
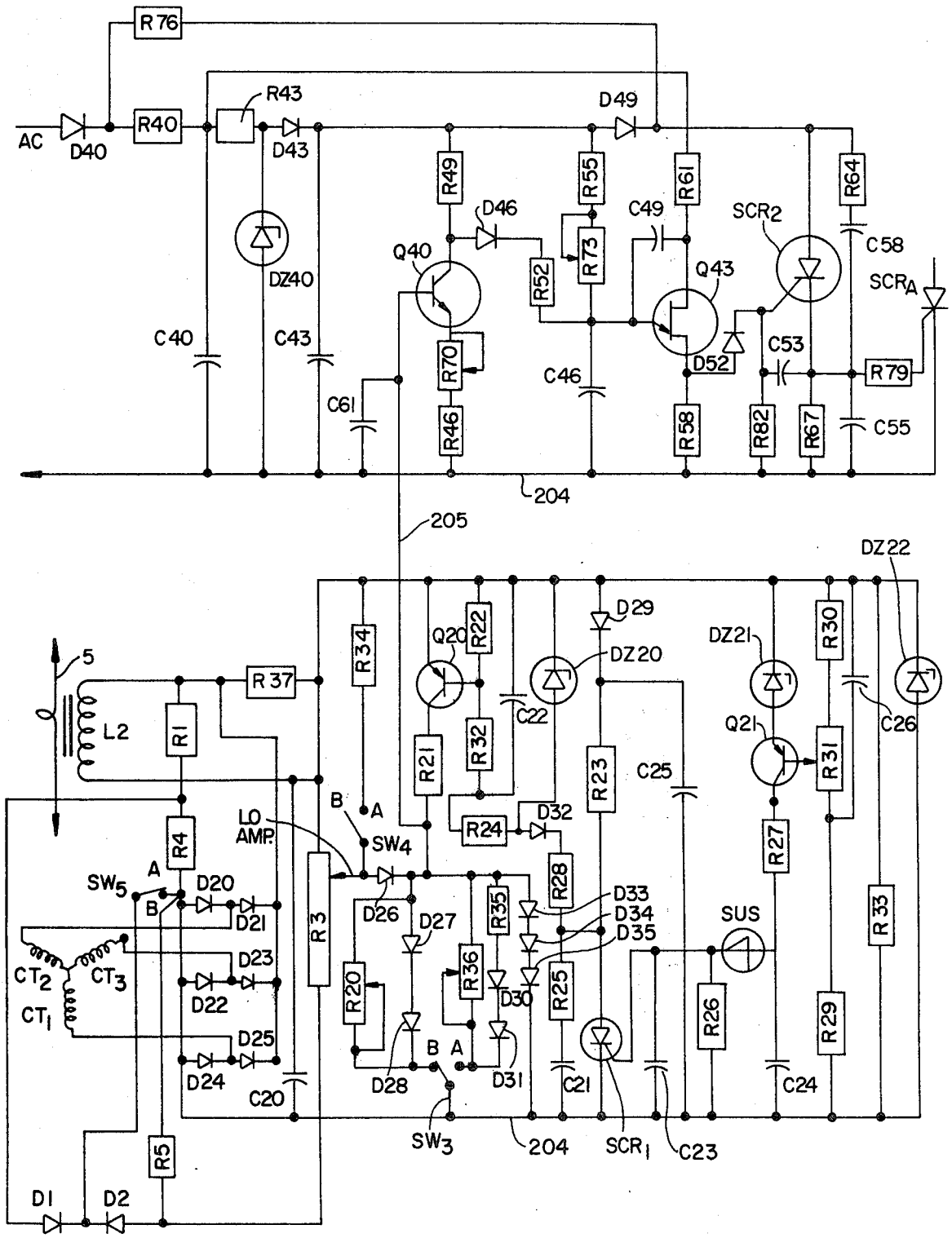
FIG. 3 is a schematic diagram of the firing control and overload protection circuits.

The firing circuits supply the energy to trigger the main SCR's with the timing required to adjust to the desired conduction angle for any output of the welder. The firing circuit also compensate for line voltage variations when the welder is loaded. There are three symmetrical firing circuits one for each of the three main SCR's, SCR-A, SCR-B, SCR-C but for simplicity only one will be described in detail in FIG. 3.

Diode D40 provides half wave rectification from an A.C. source in phase with the voltage inputs to the respective main SCR. This voltage is supplied from auxiliary windings (not shown) on Transformer T. Resistor R40 is a current limiting resistor for the zener voltage regulating diode, DZ40. C40 and C49 are transient voltage and R.F. suppression capacitors. D43 is a blocking diode that won't let C43 discharge through the zener diode. C43 filters the timing circuit voltage and also supplies the triggering power pulse to the main SCR. R64 and C58 comprise the snubber network for the pilot SCR, SCR-2. C55 protects the gate of the main SCR from R.F. C53 and D52 protect the pilot SCR's gate from R.F. and R82 provides a leakage path for the anode to gate leakage current. R67 is the load resistor and limits the current through SCR-2. R67 and R79 limit the gate current of the main SCR. C61 protects the input to the circuits from R.F. interference and transients. R76 parallels R40 once SCR-2 turns on. This supplies sufficient "back porch" energy to trigger the main SCR. D49 blocks current through R76 until SCR-2 is turned on.

The remainder of the components Q43, C46, R58 and R61 generate the timing signal that triggers $SCR_2$ to produce a desired output. These components make up a conventional relaxation oscillator.

The unijunction transistor, Q43, triggers when the voltage across C46 reaches the triggering point of the unijunction transistor. This value is the voltage from base one to base two times the intrinsic stand-off ratio of the unijunction. R61, the base two resistor, is tied to R43 and is therefore not regulated by the zener diode. This will raise or lower the voltage $V_{B1}$ to $V_{B2}$, with increases or decreases in line voltage yielding line voltage compensation.

There are two paths for charging current to flow into C46. The first path is through R55 and R73 and produces a voltage 50 (see FIG. 5) that increases with time. This is a ramp voltage. The second path is through R49, D46 and R52. This path, a low resistance path, will charge the capacitor C46 very rapidly to a point determined by the divider network of R49 and Q40, R70 and R46. This network provides a pedestal function of voltage 51. The change in conduction angle is produced by a change in the pedestal function and is controlled by the current of the welder. The current feedback will control the magnitude of the pedestal function by varying the voltage collector to emitter of the transistor Q40. This is done by introducing the feedback signal on 205 into the base of transistor Q40. The signal introduced into the base circuit will reduce the voltage collector to emitter of Q40 and increase the time to trigger unijunction transistor Q43.

The firing circuit is designed to yield preferably a four to one ratio of short circuit to welding current under minimum output conditions. This is accomplished by adjusting R70 which sets the level to which the pedestal voltage on Q43 will drop under minimum output load conditions. The drop in pedestal voltage sets the amount of phase back of the main SCR's. For currents above minimum output, the short circuit to welding current ratio is reduced. As an example, at machine rating, the ratio of short circuit to welding current is reduced preferably to 1.25:1.

The above is accomplished by the adjustment of the firing circuit and the control and feedback conditioning section of the circuit. At minimum output of the machine, 100 percent of the feedback is used to phase the output of the main SCR's back. This phase back condition reduces the output voltage of the main SCR's. As a result, a small change in current will yield a large change in feedback voltage which will produce a large change in phase back angle.

As the welding current is increased, by adjusting the current control potentiometer R3, the percentage of feedback voltage is decreased. Thus for a given change in current, a smaller percentage of feedback is fed into the firing circuit, yielding a smaller change in conduction angle. This change in percentage of feedback is a unique way of changing the short circuit to welding current ratio as the output current is increased.

The change in ratio of short circuit to welding current is one of the features that make the present embodiment such a good stick and sub-arc welding machine. If the slope of the output were vertical, the same or nearly the same ratio of short circuit current to welding current would result at all currents and the electrode would tend to stick. If the slope were strictly reactive, i.e. a small change in voltage for a change in current, the short circuit current would be too high at the higher current settings and too low at the lower current settings. Therefore, the invention provides a dual slope machine that has the capability of selecting the short circuit current for a given welding current.

The firing circuit has two adjustments. One adjustment is to set the maximum possible phase back angle using R73, and the second is to set the short circuit current value at at minimum output using R70.

Two other features of the firing circuit are line voltage compensation and a back porch circuit. The line voltage compensation is accomplished by not clamping the voltage from R40 applied to base 2 of the unijunction transistor Q43. The back porch circuit, is a circuit from D40 that supplies more than enough half wave 60 cycle energy properly phased to the main SCR, to turn it on. Oncce SCR-2 fires, a large pulse of energy is supplied to the gate of the respective main SCR. If there is a phase shift between the anode voltage applied to the main SCR's and the gate signal, as happens under large current changes, the main SCR will not get a gate pulse at the proper time and it will not turn on. To preclude a problem of this type, there is enough back porch signal through D40, R76, SCR-2 and R79 to turn on the main SCR. The back porch energy follows the initial gate pulse and is there for the remainder of the half cycle and applied to the gate of the main SCR to turn it on if the initial firing pulse fails to do so.

It will thus be seen that a control circuit is provided which will change the firing angle of the main SCR's quickly enough to compensate for the large inductance of the choke L1 in the event of short circuiting of the electrode to the workpiece and yet overloads are prevented both by the phasing back of the SCR's and the inherent drooping volt-ampere curve of the transformer T.

Preferably the transformer has a maximum open circuit voltage of 70 – 100 volts so that the main SCR's need operate at a maximum phase back angle no greater than 20° to meet the maximum output requirements of the power source.

Figure 4:
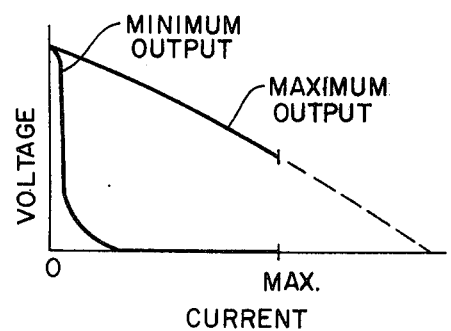
FIG. 4 is a volt-ampere curve of the power source at minimum and maximum outputs.

FIG. 4 shows typical output curves of the power source at maximum and minimum output, it being noted that at short circuit conditions the maximum current is self limiting. The main SCR's may thus be of a current rating corresponding thereto.

At the minimum output currents, it will be noted that the volt-ampere curve is quite steep but gradually decreases in slope at or close to short circuit conditions. This improves on the operation at low welding currents.

For completeness the values of the various components are listed as follows:

|  | CUZ,9/11 mfd. |  |  |
|---|---|---|---|
| Ca, Cb, Cc - | .68 400V | D40, D43, D46, |  |
| Cd | 1.0 400V | D49, D52 | 1AMP |
| C20 | .022 | D20 thru D35 | 1AMP |
| C21 | .22 | DZ20 thru DZ40 | 20V. |
| C22 | 100 | DZ21 | 6.2V. |
| C23 | .047 | DZ22 | .82V. |
| C24 | 100 | DZ40 | 20V. 1W. |
| C25 | 30 |  |  |
| C26 | 50 |  |  |
| C61 | .022 |  |  |
| C43 | 4.7 |  |  |
| C46 | .1 |  |  |
| C52 | .1 |  |  |
| C49 | .047 |  |  |
| C55 | .022 |  |  |
| C58 | .22 |  |  |
|  | ohms. |  | ohms. |
| Ra, Rb, Rc | 47 2W. | R35 | 27 |
| Rd | 27 2W. | R36 | 500 ¼W. |
| R20 | 500 ¼W. | R37 | 330 |
| R21 | 100 | R40 | 500 5W. |
| R22 | 2700 | R43 | 27 |
| R23 | 330 | R46 | 150 |
| R24 | 27000 | R49 | 3300 |
| R25 | 10 | R52 | 150 |
| R26 | 100 | R55 | 47000 |
| R27 | 39000 | R58 | 47 |
| R28 | 2700 | R61 | 680 |
| R29 | 10000 | R64 | 10 |
| R30 | 1000 | R67 | 47 |
| R31 | 500 ½W. | R70 | 500 ¼W. |
| R32 | 6800 | R73 | 100 ¼W. |
| R33 | 500 5W. | R76 | 300 5W. |
| R34 | 1500 | R79 | 5.1 |
|  |  | R82 | 100 |
|  |  | SCR1 – SCR2 | 4A, 300V. |
|  |  | SUS | 2N4989 |
|  |  | Q20 – Q21 | 2N5679 PNP |
|  |  | Q40 | 2N2393 NPN |
|  |  | Q43 | D5E43UJT 4A., 300V. |

The invention has been described with reference to a preferred embodiment. Obviously modifications and alterations will occur to others upon a reading and understanding of the invention as described and it is our intention to include such alterations and modifications insofar as they come within the scope of the appended claims or the equivalents thereof.

Having thus described our invention, we claim:

1. In a three phase-transformer-rectifier-type D.C. arc welding power source including: a transformer having at least three primary and at least three wye connected secondary windings; a full wave bridge including at least three main SCR's, each having an input terminal associated with a separate secondary winding said bridge having a pair of output terminals adapted to supply power to a welding electrode and a work piece whereby welding current will flow between said terminals, a D.C. choke in series with one of said output terminals; a control circuit for controlling the conduction angle of said SCR's and means producing a D.C. feedback signal proportional to said welding current; the improvement which comprises: at least three fixed high reactances, one in electrical series with the A.C. power in each of said secondary windings and its respective SCR whereby the transformer reactance combination has a predetermined drooping volt-ampere output curve, in combination with means for amplifying said D.C. feedback signal and feeding same to said control circuit to decrease said conduction angle with increases in said current whereby the power source has a generally constant output current when a welding arc exists.

2. The improvement of claim 1 wherein said transformer has a core, comprised of three parallel spaced legs including two outer and one center leg and members bridging both ends of said legs into closed magnetic loops, a magnetic shunt between adjacent legs intermediate the ends of said legs dividing each of said legs into a close coupled and a loose coupled section, each primary winding being on one of said close coupled sections, each secondary winding being on one of said legs, a portion of each said secondary winding being on the close coupled section and a portion on said loose coupled section, whereby the output of said transformer has a dropping volt-ampere curve.

3. The transformer of claim 2, wherein the number of secondary turns on the outer legs close coupled sections is 40–42% of the secondary turns in each secondary winding and the number of secondary turns on the center leg close coupled section is 70–75% of the secondary turns in each secondary winding, said secondary windings all having an equal number of turns.

4. The improvement of claim 1 wherein said means for producing a feedback signal is a current transformer in series with each secondary winding lead and said rectifier means.

5. The improvement of claim 1 including a choke having an iron core and a winding in electrical series between said means producing said D.C. feedback signal and said control circuit, said choke delaying the rate of change of said D.C. feedback signal to said control circit with rapid changes in welding current, a winding in electrical series with one of said output terminals and magnetically coupled to said core whereby welding current magnetically saturates said core in proportion to the welding current to reduce the inductance of said choke whereby at higher welding currents, the amount of delay caused by said choke is lowered.

6. The improvement of claim 5 wherein a resistance is in parallel with the winding of said iron core choke.

7. The improvement of claim 6 wherein said control circuit includes means responsive to large values of delayed feedback signal caused by short circuits or source overloads for decreasing the conduction angle of said SCR's to a safe value when said large values exceed a predetermined amount including means for delaying the response of said responsive means for a predetermined time period after the beginning of the short circuit.

8. The improvement of claim 7 including means for slowing the rate of decrease of the conduction angle of the SCR's after said responsive means become operative.

9. The improvement of claim 6 wherein said control circuit includes an oscillator for each SCR firing in phase with the anode voltage of said SCR, means for delaying the firing signal to decrease the conduction angle of said SCR's, said oscillator including a transistor and a capacitor and first and second parallel resistive paths for charging same to the firing potential of said transistor, said first path including a relatively high resistance, said second path including a relatively low resistance and means controlling the maximum voltage of charging through said second path including a second transistor, the conductivity of which is proportional to the pre-selected portion of said modified feedback signal voltage.

10. The improvement of claim 1 wherein said control circuit includes means responsive to large values of feedback signal caused by short circuits or source overloads for decreasing the conduction angle of said SCR's to a safe value, and separate means for delaying the actuation of said last mentioned means for a predetermined time period after beginning of said short circuit or overload.

11. The improvement of claim 10 wherein said responsive means also includes means for controlling and slowing the rate of decrease of the conduction angle of the SCR's after said time period.

12. The improvement of claim 1 wherein said control circuit includes: an oscillator for each main SCR firing in phase with the anode voltage on said main SCR; means supplying a single phase A.C. half wave rectified D.C. voltage in phase with the voltage on its respective main SCR and proportional to the line voltage for said source to said oscillator to further adjust the firing thereof upon a change of line voltage to compensate the output of said power source for line voltage variation.

13. The improvement of claim 1 wherein said series reactance comprises a portion of each secondary winding spaced from its respective primary winding and a magnetic shunt between the primary winding and said portion.

14. The improvement of claim 1 wherein the output volt-ampere curve of the transformer-reactance combination has an open circuit voltage of 70 – 100 volts and requires the SCR's to operate at a phase back angle of no greater than 20° to meet the maximum output requirements of the power source.

15. A transformer-rectifier type DC arc welding power source including: a transformer having three primary and three secondary windings, a full wave bridge including at least three main SCR's having input terminals connected by input leads to said secondary windings and a pair of DC output terminals having output leads adapted to be connected to a welding electrode and a workpiece whereby welding current will flow in said leads, a choke in series with one of said output leads; a current transformer in series with each input lead and having secondaries providing an output voltage proportional to the currents in said input leads, rectifier means associated with said current transformer secondaries to provide a DC feedback signal, a choke and paralleled resistor in series with said feedback signal to provide a modified feedback signal, means for decreasing the inductance of said choke with an increase in welding current, means for preselecting a portion of said modified feedback signal, a control circuit for said main SCR's including an oscillator having a first transistor and a capacitor which when charged to a preset value moves said first transistor to the on condition, said oscillator including an energizing lead to a DC voltage proportional to the line voltage to said power source whereby the switching on value of said first transistor varies proportionately to the line voltage, means controlling the charging of said capacitor including a first higher and second lower resistance circuit energized from a fixed voltage source and means for controlling the maximum charging voltage of said capacitor through said second lower resistance circuit including a second transistor, means feeding said pre-selected portion of modified feedback signal to said second transistor whereby the conductivity of said second transistor is proportional to said portion of said modified feedback signal, short circuit control means associated with said second transistor for moving said second transistor to the full conductivity including a third transistor energized by the total modified feedback signal and being moved to conduction by a modified feedback signal resulting from weld currents in excess of the maximum current rating of said power source, a pilot SCR turned on by turn on of said third transistor means delaying the turn on of said pilot SCR for a predetermined time period after the application of said short circuit modified feedback signal voltage, a fourth transistor moved to conduction by said turn on of said pilot SCR, means delaying the rate of change of the conduction of said fourth transistor and means feeding the output of said fourth transistor to conduction and increasing the charging time of said oscillator capacitor to a time that will reduce the conduction angle of the main SCR's to a safe output current.

\* \* \* \* \*